United States Patent
Hwang et al.

(10) Patent No.: US 12,096,217 B2
(45) Date of Patent: Sep. 17, 2024

(54) PUF-BASED IoT DEVICE USING CHANNEL STATE INFORMATION, AND AUTHENTICATION METHOD THEREOF

(71) Applicant: Gwangju Institute of Science and Technology, Gwangju (KR)

(72) Inventors: Eui Seok Hwang, Gwangju (KR); Seung Wook Yoon, Gwangju (KR); Seung Nam Han, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 240 days.

(21) Appl. No.: 17/840,672

(22) Filed: Jun. 15, 2022

(65) Prior Publication Data

US 2023/0180002 A1 Jun. 8, 2023

(30) Foreign Application Priority Data

Dec. 2, 2021 (KR) .................. 10-2021-0170843

(51) Int. Cl.
*H04W 12/069* (2021.01)
*H04L 9/40* (2022.01)

(52) U.S. Cl.
CPC ......... *H04W 12/069* (2021.01); *H04L 63/062* (2013.01)

(58) Field of Classification Search
CPC .. H04W 12/069; H04W 12/06; H04L 63/062; H04L 9/3278; H04L 9/0866; H04L 25/0202; G16Y 40/50
See application file for complete search history.

(56) References Cited

U.S. PATENT DOCUMENTS

| 4,525,849 A * | 6/1985 | Wolf ................. G06F 5/12 375/372 |
| 2003/0204743 A1* | 10/2003 | Devadas ............. G06F 21/72 257/E23.179 |
| 2006/0210082 A1* | 9/2006 | Devadas ............. G11C 16/20 380/277 |
| 2014/0047565 A1* | 2/2014 | Baek .............. H04L 9/3278 726/30 |
| 2022/0304104 A1* | 9/2022 | Mihály ............. H04W 76/19 |
| 2022/0399056 A1* | 12/2022 | Park ............... G11C 13/0038 |

FOREIGN PATENT DOCUMENTS

| EP | 2696615 A1 * | 2/2014 | ......... G06F 21/44 |
| KR | 10-2014-0019696 A | 2/2014 | |
| KR | 10-2020-0104084 A | 9/2020 | |
| KR | 10-2298120 B1 | 9/2021 | |

OTHER PUBLICATIONS

Office Action of Korean Patent Application No. 10-2021-0170843 mailed Nov. 16, 2023.

* cited by examiner

*Primary Examiner* — John B King
(74) *Attorney, Agent, or Firm* — Revolution IP, PLLC

(57) ABSTRACT

The present invention relates to a PUF-based IoT device authentication technique, and more specifically, to a PUF-based IoT device using channel state information, and an authentication method thereof. According to an embodiment of the present invention, security of an authentication key may be strengthened by simultaneously utilizing a PUF-based authentication method and an RF characteristic-based authentication method.

11 Claims, 7 Drawing Sheets

PUF-BASED IoT DEVICE USING CHANNEL STATE INFORMATION, AND AUTHENTICATION METHOD THEREOF

BACKGROUND OF THE INVENTION

Field of the Invention

The present invention relates to a PUF-based IoT device authentication technique, and more specifically, to a PUF-based IoT device using channel state information, and an authentication method thereof.

Background of the Related Art

A Physical Unclonable Function (PUF)-based secret key technique means a technique for generating and utilizing a secret key using a difference in the microstructure of semiconductors produced in the same manufacturing process. The PUF-based secret key generation technique is a hardware-based security technique used in various fields such as RFID, IoT, and the like based on physically unclonable features.

Generally, the PUF technique is characterized in that authentication of a device is performed based on a challenge-response pair (CRP). However, the PUF technique may pose a threat to device security when the CRP table is exposed through eavesdropping by an attacker in a wireless network. In addition, a security key generation method utilizing only radio frequency (RF) characteristics has a problem in that the same secret key may be generated when an eavesdropper is located near the user.

The background art of the present invention is disclosed in Korean Laid-Opened Patent No. 10-2020-0104084.

SUMMARY OF THE INVENTION

The present invention provides a PUF-based IoT device using channel state information, which is robust to exposure of a CRP of PUF by simultaneously utilizing a PUF-based authentication method and an RF characteristic-based authentication method, and an authentication method thereof.

It may be understood that the technical problems to be solved by the present invention are not limited to the technical problems mentioned above, and other unmentioned technical problems may be clearly understood by those skilled in the art from the description below.

According to one aspect of the present invention, there is provided a PUF-based IoT device using channel state information.

The PUF-based IoT device using channel state information according to an embodiment of the present invention may comprise: a data transmission/reception unit for transmitting and receiving data for estimating the channel state information; a channel state information estimation unit for estimating the channel state information based on the received data; a PUF control signal generation unit for generating a PUF control signal by dividing vector information of the channel state information; a secret key generation unit for generating a secret key based on the PUF control signal; and a transmission unit for transmitting a response signal to an authentication server.

According to another aspect of the present invention, there is provided a method of authenticating a PUF-based IoT device using channel state information.

The method of authenticating a PUF-based IoT device using channel state information according to an embodiment of the present invention may comprise the steps of: transmitting and receiving data for estimating the channel state information; estimating the channel state information based on the received data; generating a PUF control signal by dividing vector information of the channel state information; generating a secret key based on the PUF control signal; and transmitting a response signal including the secret key to an authentication server.

DETAILED DESCRIPTION OF THE PREFERRED EMBODIMENT

Figure 1:
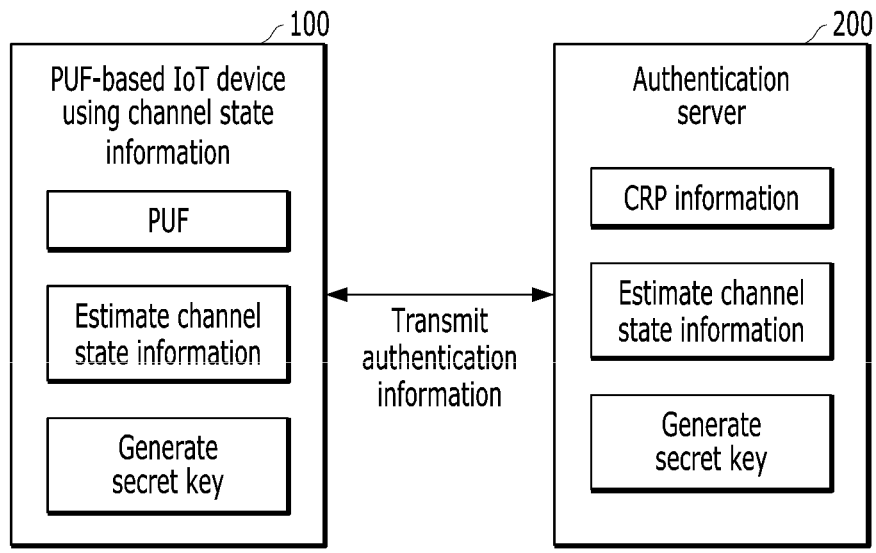
FIG. 1 is a block diagram showing a PUF-based IoT device authentication system using channel state information according to an embodiment of the present invention.

Hereinafter, the present invention will be described with reference to the accompanying drawings. However, the present invention may be implemented in several different forms, and thus is not limited to the embodiments described herein. In addition, in order to clearly explain the present invention in the drawings, parts unrelated to the description are omitted, and similar reference numerals are attached to similar parts throughout the specification.

Throughout the specification, when a part is "linked (connected, contacted, coupled)" to another part, it includes the cases of being "indirectly connected" with intervention of another member therebetween, as well as the cases of being "directly connected". In addition, when a part "includes" a certain component, this means that other components may be further provided rather than excluding other components unless clearly stated otherwise.

The terms used in this specification are used only to describe specific embodiments, and are not intended to limit the present invention. Singular expressions include plural expressions unless the context clearly dictates otherwise. It should be understood that in the present specification, terms such as "comprise" or "have" are intended to specify existence of a feature, number, step, operation, component, part, or combination thereof described in the specification, not to preclude the possibility of existence or addition of one or more other features, numbers, steps, operations, components, parts, or combinations thereof.

FIG. 1 is a block diagram showing a PUF-based IoT device authentication system using channel state information according to an embodiment of the present invention.

A PUF-based IoT device authentication system 10 using channel state information exchanges information needed to authenticate a device and information on a result of processing authentication between the device and an authentication server, and performs authentication using channel state information of a wireless communication channel based on a physical unclonable function (PUF).

At this point, the PUF-based IoT device authentication system 10 using channel state information generates a PUF control signal based on RF characteristic information, which is wireless environment characteristic information that is unique when a device is in a specific location, and performs authentication between the device and the authentication server by transmitting a PUF-based secret key generated using the PUF control signal to the authentication server.

The PUF-based IoT device authentication system 10 using channel state information includes a PUF-based IoT device 100 using channel state information and an authentication server 200.

The PUF-based IoT device 100 using channel state information transmits random data that is needed for the authentication server 200 to estimate channel state information.

The PUF-based IoT device 100 using channel state information estimates channel state information based on the random data or a part of a challenge signal received from the authentication server 200, and controls PUF information using the estimated channel state information to generate a secret key.

The PUF-based IoT device 100 using channel state information generates a PUF-based secret key considering the characteristics of the channel state information through PUF control, and transmits the PUF-based secret key to the authentication server 200.

The authentication server 200 stores and manages at least one or more pieces of challenge-response pair (CRP) about the PUF-based IoT device 100 using channel state information in a database. The authentication server 200 transmits random data or a part of a challenge signal for estimating channel state information in response to a request of the PUF-based IoT device 100 using channel state information.

The authentication server 200 authenticates a device by verifying a shared key received from the PUF-based IoT device 100 using channel state information.

Figure 2:
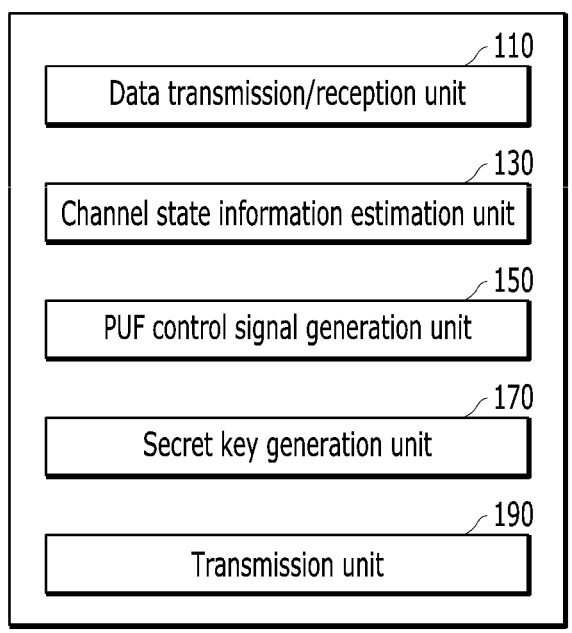
FIGS. 2 to 4 are views for explaining a PUF-based IoT device using channel state information according to an embodiment of the present invention.
Figure 3:
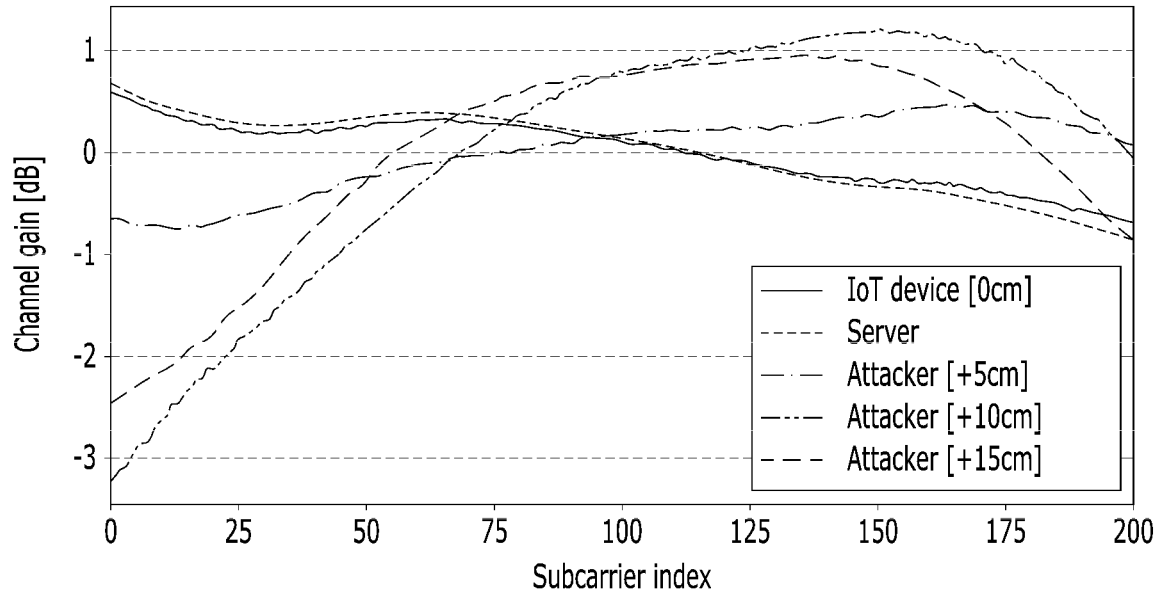
Figure 4:
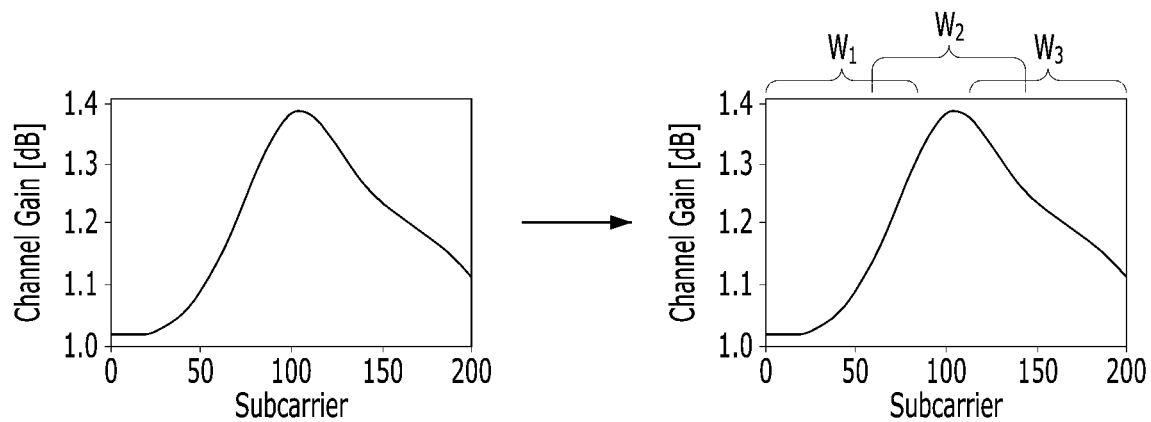

FIGS. 2 to 4 are views for explaining a PUF-based IoT device using channel state information according to an embodiment of the present invention.

Referring to FIG. 2, the PUF-based IoT device 100 using channel state information includes a data transmission/reception unit 110, a channel state information estimation unit 130, a PUF control signal generation unit 150, a secret key generation unit 170, and a transmission unit 190.

The data transmission/reception unit 110 transmits and receives data for estimating channel state information. Specifically, the data transmission/reception unit 110 may exchange random data or a part of a challenge signal with the authentication server 200 to estimate channel state information of a wireless communication channel. At this point, the data transmission/reception unit 110 may include a separate communication module for transmission and reception of data.

The channel state information estimation unit 130 estimates channel state information based on the data received from the authentication server 200. The channel state information estimation unit 130 may estimate at least one or more pieces of channel state information between channels by analyzing the random data using a module that analyzes channel state information such as a received signal strength indicator (RSSI), a channel gain, and the like.

At this point, the channel state information estimation unit 130 may perform preprocessing on the estimated channel state information to have a channel state information value the same as that of the authentication server 200. For example, the channel state information estimation unit 130 may perform preprocessing such as smoothing, normalization, and the like on the estimated channel state information.

That is, as shown in FIG. 3, the channel state information estimation unit 130 may allow the device and the authentication server 200 to have the same channel state information value by preprocessing the channel state information that changes in real-time according to the environment such as time, space and the like.

The PUF control signal generation unit 150 may generate a PUF control signal using vector information of the estimated channel state information. Specifically, the PUF control signal generation unit 150 may generate a plurality of PUF control signals by dividing the vector information. The PUF control signal generation unit 150 may generate PUF control signals using a PUF control signal generation model of various hashing methods such as uniform quantization, autoencoder, k-means clustering, and the like.

For example, the PUF control signal generation unit 150 may generate a plurality of PUF control signals by dividing the vector information of the estimated channel state into N pieces (W1, W2, W3) of information as shown in FIG. 4.

The PUF control signal generation unit 150 may improve the speed of generating the PUF control signals by reducing input data size of the PUF control signal generation model by dividing the vector information of the channel state information. In addition, the PUF control signal generation unit 150 may strengthen authentication security of IoT devices by preventing security problems (e.g., a replay attack or a side channel attack of acquiring similar channel state information from a nearby location, a method of directly extracting CRP by directly accessing hardware, and the like) that may occur when single channel state information is used.

The secret key generation unit 170 generates a secret key based on the plurality of PUF control signals. The secret key generation unit 170 may generate a secret key using a PUF capable of generating a CRP table, such as SRAM-PUF, RO-PUF, or the like.

The transmission unit 190 transmits a response signal including the generated secret key to the authentication server 200. At this point, the transmission unit 190 may change the order of challenge signals or generate a new challenge signal by using PUF control signal. The transmission unit 190 may perform encoding and decoding for data transmission when it transmits the response signal to the authentication server 200.

Figure 5:
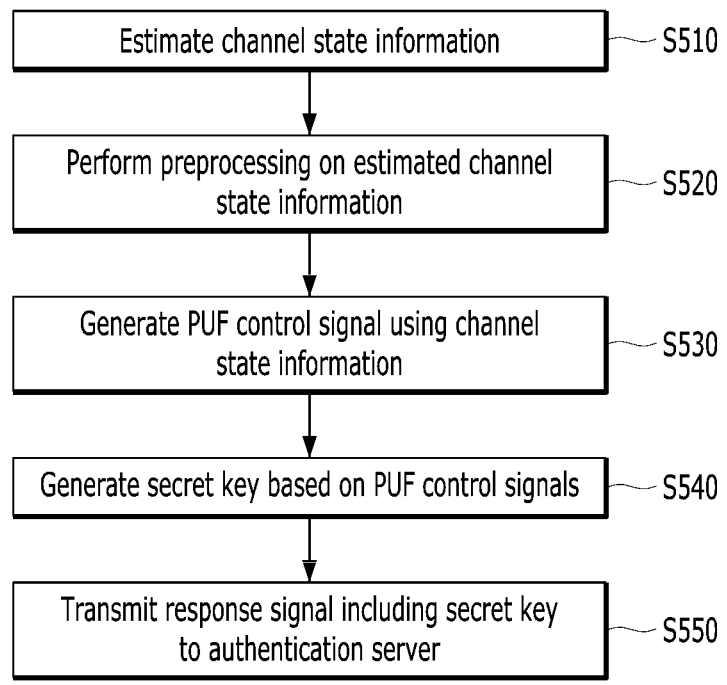
FIG. 5 is a flowchart illustrating a method of authenticating a PUF-based IoT device using channel state information according to an embodiment of the present invention.

FIG. 5 is a flowchart illustrating a method of authenticating a PUF-based IoT device using channel state information according to an embodiment of the present invention.

Referring to FIG. 5, at S510, the PUF-based IoT device 100 using channel state information receives random data or a part of data of a challenge signal for estimating channel state information from the authentication server 200, and estimates channel state information based on the received data. The PUF-based IoT device 100 using channel state information may estimate at least one or more pieces of channel state information between channels by analyzing the random data using a module that analyzes channel state information such as a received signal strength indicator (RSSI), a channel gain, and the like.

At S520, the PUF-based IoT device 100 using channel state information performs preprocessing on the estimated channel state information to have a channel state information value the same as that of the authentication server 200. For example, the PUF-based IoT device 100 using channel state information may perform preprocessing such as smoothing, normalization, and the like on the estimated channel state information.

At S530, the PUF-based IoT device 100 using channel state information may generate a PUF control signal using vector information of the estimated channel state information. The PUF-based IoT device 100 using channel state information may generate a PUF control signal using a PUF control signal generation model of various hashing methods such as uniform quantization, autoencoder, k-means clustering, and the like. The PUF-based IoT device 100 using channel state information, which has small computational resources, may generate a plurality of PUF control signals by dividing the vector information into several pieces.

At S540, the PUF-based IoT device 100 using channel state information generates a PUF-based secret key based on the plurality of PUF control signals. The PUF-based IoT device 100 using channel state information may generate a secret key using a PUF capable of generating a CRP table, such as SRAM-PUF, RO-PUF, or the like.

At S550, the PUF-based IoT device 100 using channel state information transmits a response signal including the generated PUF-based secret key to the authentication server 200. At this point, the PUF-based IoT device 100 using channel state information may change the order of challenge signals or generate a new challenge signal by using PUF control signals based on channel state information. The PUF-based IoT device 100 using channel state information may perform encoding and decoding for data transmission when it transmits the response signal to the authentication server 200.

Figure 6:
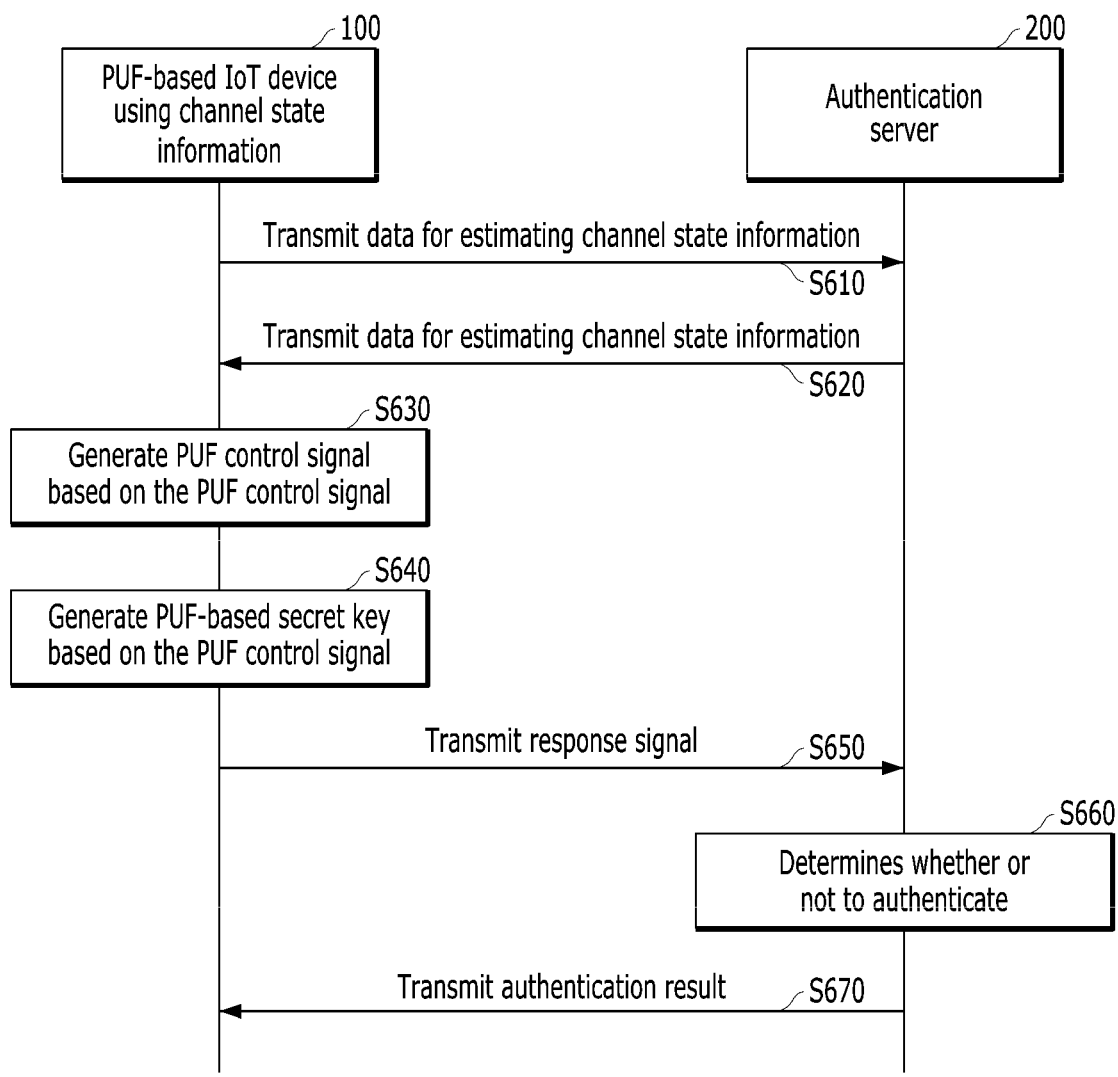
FIG. 6 is a sequence diagram illustrating operations of a PUF-based IoT device using channel state information and an authentication server according to a first embodiment of the present invention.

FIG. 6 is a sequence diagram illustrating operations of a PUF-based IoT device using channel state information and an authentication server according to a first embodiment of the present invention.

Referring to FIG. 6, at S610, the PUF-based IoT device 100 using channel state information transmits random data for estimating channel state information to the authentication server 200.

At S620, the authentication server 200 transmits random data for estimating channel state information to the PUF-based IoT device 100 using channel state information.

At S630, the PUF-based IoT device 100 using channel state information estimates at least one or more pieces of channel state information, performs preprocessing such as smoothing, normalization, and the like on the estimated channel state information, and generates a PUF control signal, which is a secret key control signal, using the preprocessed channel state information.

At S640, the PUF-based IoT device 100 using channel state information generates a secret key considering the characteristics of the channel state information based on the PUF control signal.

At S650, the PUF-based IoT device 100 using channel state information transmits a response signal including the secret key.

At S660, the authentication server 200 determines whether or not to authenticate.

At S670, the authentication server 200 transmits an authentication result to the PUF-based IoT device 100 using channel state information.

Figure 7:
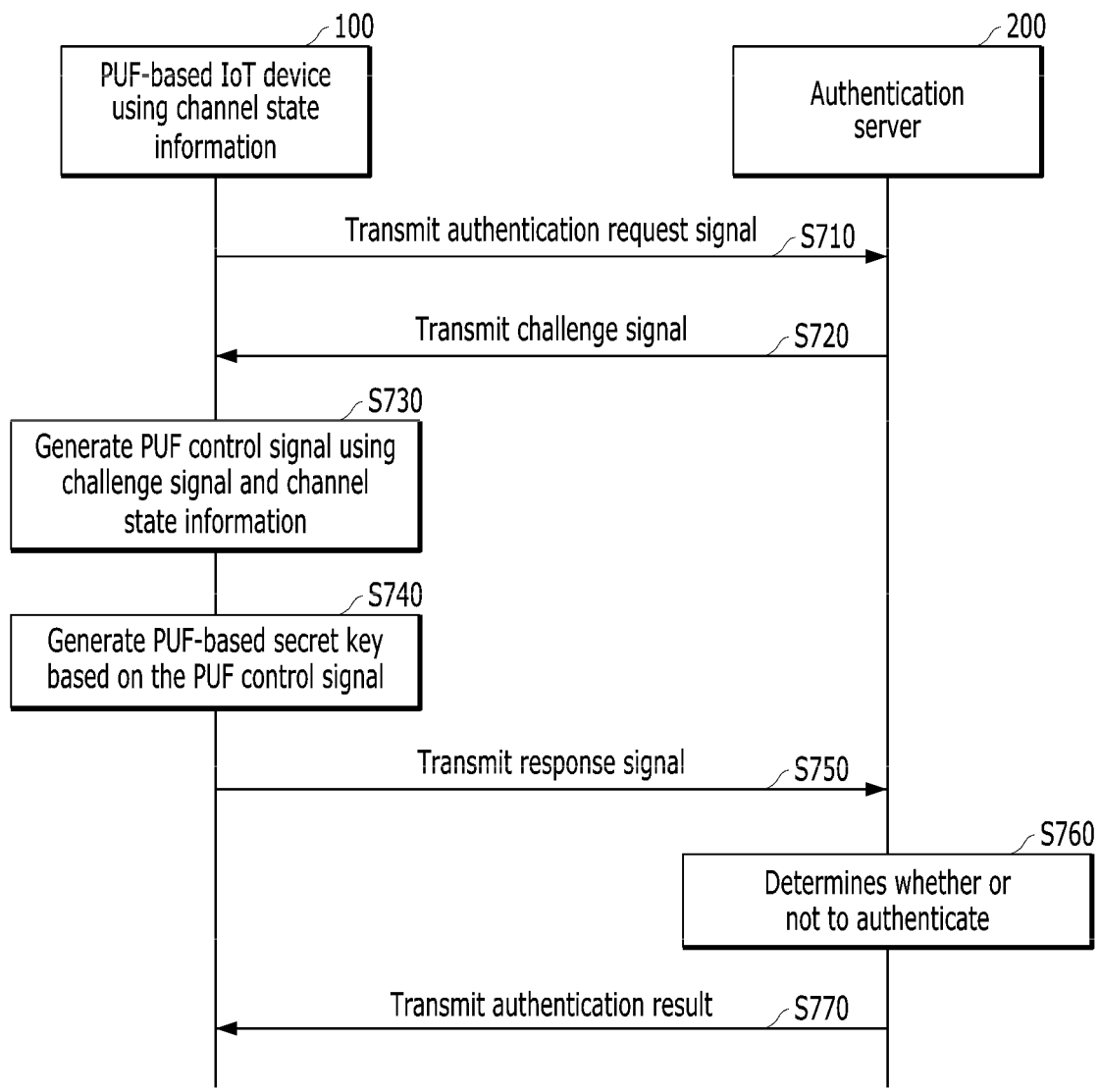
FIG. 7 is a sequence diagram illustrating operations of a PUF-based IoT device using channel state information and an authentication server according to a second embodiment of the present invention.

FIG. 7 is a sequence diagram illustrating operations of a PUF-based IoT device using channel state information and an authentication server according to a second embodiment of the present invention.

Referring to FIG. 7, at S710, the PUF-based IoT device 100 using channel state information transmits an authentication request signal or a part of a challenge signal to the authentication server 200.

At S720, the authentication server 200 transmits a part of the challenge signal to the PUF-based IoT device 100 using channel state information.

At S730, the PUF-based IoT device 100 using channel state information estimates at least one or more pieces of channel state information using the challenge signal and the channel state information, performs preprocessing such as smoothing, normalization, and the like on the estimated channel state information, and generates a PUF control signal, which is a secret key control signal, using the preprocessed channel state information.

At S740, the PUF-based IoT device 100 using channel state information generates a secret key based on the PUF control signal.

At S750, the PUF-based IoT device 100 using channel state information transmits a response signal including the secret key.

At S760, the authentication server 200 determines whether or not to authenticate.

At S770, the user authentication server 200 transmits an authentication result to the PUF-based IoT device 100 using channel state information.

Figure 8:
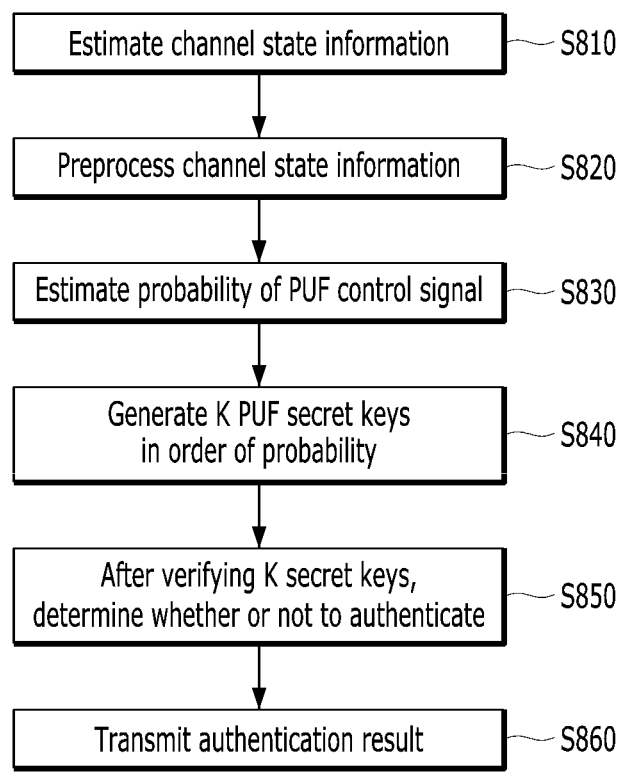
FIG. 8 is a flowchart illustrating a secret key verification method of a user authentication server according to an embodiment of the present invention.

FIG. 8 is a flowchart illustrating a secret key verification method of an authentication server according to an embodiment of the present invention.

Referring to FIG. 8, at S810, the authentication server 200 receives random data for estimating channel state information from the PUF-based IoT device 100 using channel state information and estimates at least one or more pieces of channel state information.

At S820, the authentication server 200 performs preprocessing such as smoothing, normalization, and the like on the estimated channel state information.

At S830, the authentication server 200 generates all cases of possible PUF control signals using a PUF control signal generation model as described above at S530, and calculates probability values corresponding thereto. Here, when the PUF control signal generation model is a model using a distance-based formula, the authentication server 200 may calculate a distance value instead of the probability.

At S840, the authentication server 200 selects K secret keys in order of high probability based on the calculated probability values. Here, K is a value of 1 or more, and as the value of K increases, the rate of retrying authentication by the authentication server 200 may decrease.

At S850, the authentication server 200 compares the K secret keys with the shared key received from the PUF-based IoT device 100 using channel state information, and accepts the authentication when at least one or more keys match.

At S860, the authentication server 200 transmits an authentication result to the PUF-based IoT device 100 using channel state information.

Figure 9:
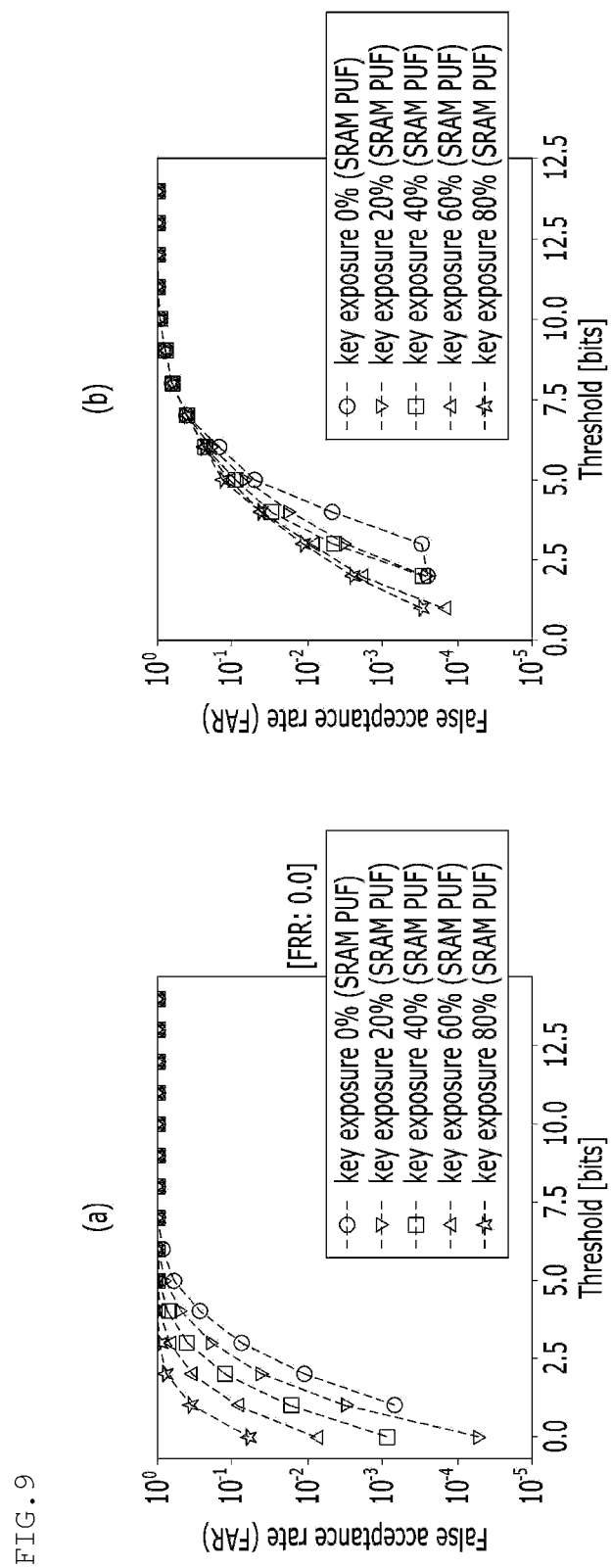
FIG. 9 is a view showing security performance of a PUF-based IoT device using channel state information according to an embodiment of the present invention.

FIG. 9 is a view showing security performance of a PUF-based IoT device using channel state information according to an embodiment of the present invention.

Referring to FIG. 9, in order to evaluate performance of the PUF-based IoT device 100 using channel state information according to an embodiment of the present invention, the key length of the evaluation target devices (a, b) is set to 32 bits, the PUF type is set to SRAM-PUF, and the number of test locations of the device is set to 50. In addition, performance evaluation of the device is conducted on the assumption that an eavesdropper may approach a legitimate device as close as λ (15 Cm), and the eavesdropper knows about the key generation method.

As a result of the performance evaluation of the device, it is shown that the probability of authenticating an eavesdropper by the PUF-based IoT device 100 using channel state information according to an embodiment of the present invention (b) has been lowered compared to that of the existing PUF-based device that does not use channel state information (a). Through this, it can be confirmed that the security performance of the PUF-based IoT device 100 using channel state information according to an embodiment of the present invention is excellent.

According to an embodiment of the present invention, security of an authentication key may be strengthened by simultaneously utilizing a PUF-based authentication method and an RF characteristic-based authentication method.

It should be understood that the effects of the present invention are not limited to the effects described above, and include all effects that can be inferred from the configuration of the invention described in the detailed description or claims of the present invention.

The description of the present invention described above is for illustrative purposes, and those skilled in the art may understand that it can be easily modified into other specific forms without changing the technical spirit or essential features of the present invention. Therefore, it should be understood that the embodiments described above are illustrative in all respects and not restrictive. For example, each component described as a single type may be implemented in a distributed form, and components described as distributed may also be implemented in a combined form likewise.

The scope of the present invention is indicated by the following claims, and all changes or modifications derived from the meaning and scope of the claims and their equivalents should be construed as being included in the scope of the present invention.

What is claimed is:

1. A PUF-based IoT device using channel state information, the device comprising a plurality of units being configured and executed by a hardware processor using algorithm, the algorithm which when executed, causing the hardware processor to perform the plurality of units, the plurality of units comprising:
    a data transmission/reception unit for transmitting and receiving data for estimating the channel state information;
    a channel state information estimation unit for estimating the channel state information based on the received data;
    a PUF control signal generation unit for generating a PUF control signal by dividing vector information of the channel state information;
    a secret key generation unit for generating a security key based on the PUF control signal; and
    a transmission unit for transmitting a response signal including the secret key to an authentication server.

2. The device according to claim 1, wherein the data transmission/reception unit transmits and receives at least one among random data and a challenge signal for estimating channel state information of a wireless communication channel to and from the authentication server.

3. The device according to claim 1, wherein the channel state information estimation unit performs at least one or more preprocessing processes among smoothing and normalization on the estimated channel state information.

4. The device according to claim 1, wherein the PUF control signal generation unit generates the PUF control signal by applying a hashing method to the channel state information.

5. The device according to claim 1, wherein the transmission unit performs encoding and decoding for data transmission when it transmits the response signal.

6. A method of authenticating a PUF-based IoT device using channel state information, the method comprising the steps of:
    transmitting and receiving data for estimating the channel state information;
    estimating the channel state information based on the received data;
    generating a PUF control signal by dividing vector information of the channel state information;
    generating a secret key based on the PUF control signal; and
    transmitting a response signal including the secret key to an authentication server.

7. The method according to claim 6, wherein the step of transmitting and receiving data for estimating the channel state information includes transmitting and receiving at least one among random data and a challenge signal for estimating state information of a wireless communication channel to and from the authentication server.

8. The method according to claim 6, wherein the step of estimating the channel state information based on the received data includes performing at least one or more preprocessing processes among smoothing and normalization on the estimated channel state information.

9. The method according to claim 6, wherein the step of generating a PUF control signal by dividing the channel state information includes generating the PUF control signal by applying a hashing method to the channel state information.

10. The method according to claim 6, wherein the step of transmitting a response signal including the secret key to an authentication server includes performing encoding and decoding for data transmission when the response signal is transmitted.

11. A non-transitory computer-readable recording medium including program instructions that, when executed by a hardware processor, cause the hardware processor to perform a method of authenticating a PUF-based IoT device using channel state information, the method comprising the steps of:
    transmitting and receiving data for estimating the channel state information;
    estimating the channel state information based on the received data;
    generating a PUF control signal by dividing vector information of the channel state information;
    generating a secret key based on the PUF control signal; and transmitting a response signal including the secret key to an authentication server.

* * * * *